United States Patent [19]

Kurihashi et al.

[11] Patent Number: 5,644,010

[45] Date of Patent: Jul. 1, 1997

[54] CURABLE LIQUID RESIN, PROCESS FOR THE PRODUCTION THEREOF AND USE THEREOF

[75] Inventors: Toru Kurihashi; Miki Kawashima; Takeo Yamaguchi, all of Tokyo, Japan

[73] Assignee: Toyo Ink Manufacturing Co., Ltd., Tokyo, Japan

[21] Appl. No.: 503,723

[22] Filed: Jul. 18, 1995

[30] Foreign Application Priority Data

| | | | |
|---|---|---|---|
| Jul. 22, 1994 | [JP] | Japan | 6-170510 |
| Aug. 4, 1994 | [JP] | Japan | 6-183197 |
| Aug. 19, 1994 | [JP] | Japan | 6-195175 |

[51] Int. Cl.$^6$ .................. C08F 224/00; C08F 220/58; C08F 220/04; C08F 220/10; C08F 230/00; C07C 69/54; C07C 233/16; C07C 11/12

[52] U.S. Cl. .................. 526/273; 526/304; 526/318.42; 526/328.5; 526/338; 560/205; 560/224; 562/598; 564/204; 585/18; 106/901

[58] Field of Search .................. 526/273, 304, 526/318.42, 328.5, 338; 560/205, 224; 562/598; 564/204; 585/18; 106/901

[56] References Cited

U.S. PATENT DOCUMENTS

| | | | |
|---|---|---|---|
| 3,817,946 | 6/1974 | Ree | 526/273 |
| 3,857,905 | 12/1974 | Blackley et al. | 526/273 |
| 3,988,273 | 10/1976 | Tetsuo et al. | 526/273 |
| 4,035,330 | 7/1977 | Schultz | 526/273 |
| 4,388,448 | 6/1983 | Melby | 525/327.3 |
| 5,576,405 | 11/1996 | Kawashima et al. | 526/318.4 |

FOREIGN PATENT DOCUMENTS

| | | |
|---|---|---|
| 0628579 | 12/1994 | European Pat. Off. . |
| 2240242 | 3/1975 | France . |
| 1469682 | 4/1977 | United Kingdom . |

*Primary Examiner*—Joseph L. Schofer
*Assistant Examiner*—Wu C. Cheng
*Attorney, Agent, or Firm*—Wenderoth, Lind & Ponack

[57] ABSTRACT

A curable liquid resin which can give a coating composition capable of forming a film, the curable liquid resin being a copolymer obtained from (A) a monomer of the formula (1) or (2), $$CH_2=C(R^1)COO-R^2 \quad (1)$$

$$CH_2=C(R^3)COO(C_nH_{2n}O)_m-R^4 \quad (2)$$

and (B) at least one monomer selected from the group consisting of (B1) a monomer prepared by reacting an ethylenically unsaturated epoxide (a) with a fatty acid (b) of the formula (3)

$$R^5COOH \quad (3)$$

(B2) a monomer of the formula (4), $$CH_2=C(R^6)CONR^7R^8 \quad (4)$$

and (B3) a monomer whose molecule has at least two ethylenically unsaturated double bonds.

16 Claims, No Drawings

CURABLE LIQUID RESIN, PROCESS FOR THE PRODUCTION THEREOF AND USE THEREOF

FIELD OF THE INVENTION

The present invention relates to a curable liquid resin which can give a cured coating or film ("film" hereinafter) as a resin for film-forming materials such as a coating composition and an ink or for an adhesive, in the absence of a solvent, and a process for the production thereof.

PRIOR ART OF THE INVENTION

Resin systems containing organic solvents have been used as coating compositions, adhesives or inks. It is known that the above resin systems scatter a large portion of organic solvent at the film-forming step such as an application step or a printing step and at the curing and drying step. With increasing attention to global environments and working environments, various limitations have come to be imposed on the use of organic solvents. There are therefore various measures proposed for converting resins containing organic solvents to solvent-free resins which can be used as a film-forming material.

Resin systems for use as solvent-free resins are largely classified into a precursor system and a polymer system. The precursor system contains a monomer having a low molecular weight or a prepolymer, and it is therefore in the form of a liquid having a low viscosity. The precursor system therefore can be utilized by a conventional film-forming method. However, in the precursor system which is a composition containing a monomer having a low molecular weight, there are hygienic problems remaining to solve, such as the scattering of a monomer having a low molecular weight. Further, it is known that, when the precursor system is a coating composition containing a resin having a molecular weight in the range of oligomers, it is difficult to control the properties of a cured product therefrom (S. Muroi, Preprints of "Lectures in the Society for the Study of Adhesion and Coating, 1992", page 4, 1993), and it is therefore desired to increase the molecular weight of the resin while maintaining the low viscosity.

On the other hand, in the polymer system, it is required to bring a solid polymer in a liquid state by some method or to devise a film-forming method. In a plastisol which is a solid polymer brought into a liquid state with a nonvolatile plasticizer, a typical example prepared by a conventional method of bringing a solid polymer into a liquid state in the absence of an organic solvent, there are problems pointed out in that it is difficult to obtain a cured product having a sufficient hardness and that the plasticizer cross-migrates. In latex systems such as an emulsion and a hydrosol, there are problems pointed out in that a cured product is not homogeneous and that the drying rate is low. In water-soluble resin systems which are considered the most effective at present, there are also problems remaining to solve in a low drying rate, water resistance and waste water disposal. Further, most water-soluble resin systems contain at least 10% by weight of an organic solvent for improving the dispersibitity of a pigment and the film formability. Further, in the case of powder or hot-melt resin systems, the film-forming method therefor is quite different from a conventional film-forming method, so that it is necessary to introduce a new apparatus.

SUMMARY OF THE INVENTION

It is an object of the present invention to provide a curable liquid resin which can give a coating composition capable of forming a film without polluting a working environment with an organic solvent, and a composition for a film-forming material.

It is another object of the present invention to provide a curable liquid resin which can give a coating composition capable of forming a film without any special exhaust gas processing apparatus and without polluting a working environment with an organic solvent, and a composition for a film-forming material.

It is further another object of the present invention to provide a curable liquid resin which can give a coating composition capable of forming a film with a conventional roll coater or knife coater, and a composition for a film-forming material.

It is still further another object of the present invention to provide a curable liquid resin which can give a coating composition capable of forming a film at room temperature, and a composition for a film-forming material.

According to the present invention, there is provided a liquid resin having a number average molecular weight of 10,000 to 200,000 and a viscosity, measured at 50° C., in the range of from 500 cps to 30,000 cps, the liquid resin being a copolymer obtained from (A) a monomer of the formula (1) or (2), $$CH_2=C(R^1)COO-R^2 \qquad (1)$$

wherein $R^1$ is hydrogen or methyl, $R^2$ is an alkyl group having 4 to 22 carbon atoms, $$CH_2=C(R^3)COO(C_nH_{2n}O)_m-R^4 \qquad (2)$$

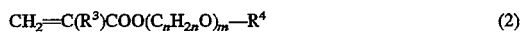

wherein $R^3$ is hydrogen or methyl, $R^4$ is an alkyl group having 1 to 5 carbon atoms, n is an integer of 1 to 3 and m is an integer of 4 to 25, and (B) at least one monomer selected from the group consisting of (B1) a monomer prepared by reacting an ethylenically unsaturated epoxide (a) with a fatty acid (b) of the formula (3)

$$R^5COOH \qquad (3)$$

wherein $R^5$ is an unsaturated aliphatic hydrocarbon group having 3 to 30 carbon atoms and having at least one double bond, (B2) a monomer of the formula (4), $$CH_2=C(R^6)CONR^7R^8 \qquad (4)$$

wherein $R^6$ is hydrogen or methyl and each of $R^7$ and $R^8$ is hydrogen or a functional group of $CH_2OR^9$ provided that at least one of $R^7$ and $R^8$ is a functional group of $CH_2OR^9$ in which $R^9$ is hydrogen or an alkyl group having 1 to 5 carbon atoms, and (B3) a monomer whose molecule has at least two ethylenically unsaturated double bonds.

Further, according to the present invention, there is also provided a curable liquid resin which is a copolymer obtained from the above monomer (A), the above monomer (B) and other polymerizable vinyl monomer (C).

Further, according to the present invention, there is also provided a process for the production of a liquid resin, which comprises radical-polymerizing the above monomers (A) and (B) in a water-soluble or water-miscible solvent which may contain water.

Further, according to the present invention, there is also provided a process for the production of a liquid resin, which comprises radical-polymerizing the above monomers (A), (B) and (C) in a water-soluble or water-miscible solvent which may contain water.

Further, according to the present invention, there is also provided a composition for use as a film-forming material, comprising the above curable liquid resin and a curing catalyst.

DETAILED DESCRIPTION OF THE INVENTION

The monomer (A) of the formula (1) or (2) is used as a component for bringing the copolymer into a liquid state. Examples of the monomer (A) of the formula (1) include alkyl (meth)acrylates of which the alkyl group has 4 to 22 carbon atoms such as 2-ethylhexyl (meth)acrylate, butyl (meth)acrylate, pentyl (meth)acrylate, heptyl (meth) acrylate, hexyl (meth)acrylate, octyl (meth)acrylate, nonyl (meth)acrylate, decyl (meth)acrylate, undecyl (meth) acrylate, dodecyl (meth)acrylate, tridecyl (meth)acrylate, tetradecyl (meth)acrylate, pentadecyl (meth)acrylate, hexadenyl (meth)acrylate, heptadecyl (meth)acrylate, octadecyl (meth)acrylate, nonadecyl (meth)acrylate, eicosyl (meth) acrylate, heneicosyl (meth)acrylate, and docosyl (meth) acrylate. Above all, alkyl acrylates of which the alkyl group has 8 to 20 carbon atoms and alkyl methacrylates corresponding to these alkyl acrylates are preferred. When the alkyl group of the above (meth)acrylates has less than 4 carbon atoms, undesirably, it is difficult to obtain a liquid resin. When the alkyl group of the (meth)acrylates has more than 22 carbon atoms, undesirably, it is difficult to increase the polymerization degree of the resin, and the resin is a solid at 50° C. or lower so that a special melting device is required.

Examples of the monomer (A) of the formula (2) include methoxytetraethylene glycol (meth)acrylate, ethoxytetraethylene glycol (meth)acrylate, propoxytetraethylene glycol (meth)acrylate, n-butoxytetraethylene glycol (meth) acrylate, n-pentyloxttetraethylene glycol(meth)acrylate, methoxytetrapropylene glycol (meth)acrylate, ethoxytetrapropylene glycol (meth)acrylate, propoxytetrapropylene glycol (meth)acrylate, n-butoxytetrapropylene glycol (meth) acrylate, n-pentaoxytetrapropylene glycol (meth)acrylate, methoxypolyethylene glycol (meth)acrylate, and ethoxypolyethylene glycol (meth)acrylate. When an acrylate having a polyoxyalkylene chain having 4 to 25, preferably 5 to 22, recurring units, or a methacrylate corresponding to this acrylate is used, a copolymer having an effectively decreased viscosity can be obtained. When the number of the recurring units is less than 4, undesirably, it is difficult to obtain a liquid resin. When the number of the recurring units is more than 25, undesirably, it is difficult to increase the polymerization degree of the resin, and the resin is a solid at 50° C. or lower so that a special melting device is required.

The amount of the monomer (A) based on the copolymer (liquid resin) is 10 to 90% by weight, preferably 40 to 80% by weight. When the amount of the monomer (A) based on the copolymer is smaller than 10% by weight, undesirably, the copolymer no longer retains a low viscosity necessary for forming a film. When the above amount is greater than 90% by weight, undesirably, no hard film is obtained.

As the monomer (A), the above (meth)acrylates may be used alone or in combination. Further, when the monomer (A) of the formula (1) and the monomer (A) of the formula (2) are used in combination, preferably, the copolymer has a decreased viscosity. In this case, the weight ratio of the monomer (A) of the formula (1):monomer (A) of the formula (2) is preferably 1:9 to 9:1.

In the present invention, the formation of a film refers to the formation of a film (coating) having a resin thickness of 0.1 to 100 μm on a substrate of paper, a metal, plastic or ceramic by a printing method, a coating (painting) method, or the like.

In the present invention, the monomer (B) is used for imparting the liquid resin with curability.

The monomer (B1) is a product prepared by reacting an ethylenically unsaturated epoxide (a) with a fatty acid (b), and has an ethylenically unsaturated double bond copolymerizable with the monomer (A). The monomer (B1) imparts the function of curing (hardening) a film in that the ethylenically unsaturated double bond derived from the fatty acid (b) integrated into the copolymer is air-oxidized to be crosslinked.

Examples of the ethylenically unsaturated epoxide (a) used for preparing the monomer (B1) include epoxides having a (meth)acryl group, an allyl group and a vinyl group such as glycidyl (meth)acrylate, glycidyl cinnamate, acryl glycidyl ether, vinyl cyclohexane monoepoxide and 1,3-butadiene monoepoxide.

The fatty acid (b) of the formula (3) of $R^5COOH$ in which $R^5$ is an unsaturated aliphatic hydrocarbon group having 3 to 30 carbon atoms, is used as the other component for preparing the monomer (B1). Examples of the fatty acid (b) include linear monoenoic acids such as hexenoic acid, heptenoic acid, caproleic acid, undecylenic acid, lauroleic acid, linderic acid, obtusilic acid, tsuzuic acid, myristoleic acid, palmitoleic acid, petroselinic acid, petroselaidic acid, oleic acid, elaidic acid, vaccenic acid, erucic acid, brassidic acid and selacholeic acid; branched mono-enoic acids such as 2-methyl-2-pentenoic acid, 2,5-dimethyl-2-tridecenoic acid, 2-methyl-9-octadecenoic acid, 2-ethyl-9-octadecenoic acid, 2,2-dimethyl-11-eicosenoic acid and 2-methyl-2-hexacosenoic acid; di-, tri- and polyenoic acids such as sorbic acid, linoleic acid, linoelaidic acid, α-eleostearic acid, β-eleostearic acid, linolenic acid, linollaidic acid, pseudo-eleostearic acid, α-parinaric acid, β-parinaric acid, arachidonic acid and clupanodonic acid; and acetylenic acids such as stearolic acid behenolic acid and tariric acid. Of the above fatty acids, fatty acids of the formula (3) in which $R^5$ is an unsaturated hydrocarbon group having 16 to 22 carbon atoms and having at least one double bond are preferred as the fatty acid (b), and fatty acids of the formula (3) in which $R^5$ is an unsaturated hydrocarbon group having 16 to 22 carbon atoms and having at least 2 double bonds are more preferred as the fatty acid (b). Of the above fatty acids, linoleic acid, linolenic acid and α-eleostearic acid are preferred.

In addition to the fatty acid (b), a proper amount of at least one of the following saturated fatty acids may be added: butyric acid, valeric acid, caproic acid, enanthic acid, caprylic acid, pelargonic acid, captic acid, undecylic acid, lauric acid, tridecylic acid, myristic acid, pentadecylic acid, palmitic acid, heptadecylic acid, stearic acid, nonadecanoic acid, arachdiic acid, behenic acid, lignoceric acid, cerotic acid, heptacosanoic acid, montanic acid and melissic acid.

Further, the fatty acid (b) used in the present invention can be selected from fatty acids constituting oil and fat. For example, the fatty acid (b) is preferably selected from fatty acids constituting plant oils such as linseed oil, safflower oil, soybean oil, tung oil, rape oil, cotton seed oil, olive oil, palm oil and coconut oil, and fatty acids constituting animal oils such as beef tallow, hog fat, mutton tallow, fish oil and whale oil. Of these, linseed oil, safflower oil, soybean oil and tung oil are preferred for exhibiting curability. The above fatty acids are required to have an iodine value of at least 100, preferably at least 130.

The monomer (B1) used in the present invention can be obtained by reacting the ethylenically unsaturated epoxide (a) with the fatty acid (b) in an ethylenically unsaturated epoxide (a)/fatty acid (b) molar ratio of 1/1. In the reaction for synthesizing the moor, met (B1), there may be used a reaction mixture obtained by reacting the ethylenically unsaturated epoxide (a) with the fatty acid (b) in such a mixing ratio that the amount of carboxyl group of the fatty acid (b) is 0.5 to 2.0 mol per mole of the epoxy group of the epoxide (a).

The monomer (B1) is preferably synthesized under heat in the presence of a catalyst, although it may be synthesized in the absence of a catalyst. When the monomer (b) is synthesized in the absence of a catalyst, the reaction is carried out at a temperature at which the ethylenically unsaturated bond of the epoxide (a) does not undergo radical polymerization, preferably at a temperature of 130° C. or lower. The above catalyst is preferably selected from tertiary amines such as triethylamine, dimethylaminobenzylamine, benzyldimethylamine, 2,4,6-tris(dimethylaminomethyl) phenol, tetramethylguanidine, dimethylaminomethylphenol, N,N-dimethylcyclohexylamine, N,N',N"-tris (dimethylaminopropyl)hexahydro-S-triazine; and quaternary ammonium salts such as trimethylbenzyl ammonium chloride, triethylbenzylammonium chloride, tetramethylammonium chloride, trioctylmethylammonium chloride, trimethylbenzylammonium chloride, N-laurylpyridinium chloride, N-laurylpicolinium chloride, N-benzylpicolinium chloride, cetyltrimethylammonium chloride, phenyltrimethylammonium chloride, tetramethylammonium bromide, tetraethylammonium bromide, tetrabutylammonium bromide, triethylbenzylammonium bromide, triemthylphenylammonium bromide, tetrabutylammonium hydrogensulfate, trimethylbenzylammonium oxalate, trimethylbenzylammonium oxalate, di(trimethylbenzylammonium) oxalate, trimethylbenzylammonium maleate, trimethylbenzylammonium tartarate and trimethylammonium glycolate.

The above reaction may be carried out in the presence of a polymerization inhibitor. The polymerization inhibitor is selected from phenols such as hydroquinone, hydroquinine monmethyl ether, p-tert-butylcatechol, 2,5-di-tert-butylhydroquinone, tert-butyl hydroquinone, 2,5-diamyl hydroquinone, di-tert-butyl p-cresol; quinones such as p-benzoquinone, naphthoquinone and 2,5-diphenyl-p-benzoquinone; oximes such as quinonedioxime and cyclohexanoxime; amidines such as acetoamidinoacetate; quaternary ammonium salts; hydrazines; and amine hydrochlorides.

The monomer (B2) used in the present invention has the following formula,

CH$_2$=C(R$^6$)CONR$^7$R$^8$ (4)

wherein R$^6$ is hydrogen or methyl and each of R$^7$ and R$^8$ is hydrogen or a functional group of CH$_2$OR$^9$ provided that at least one of R$^7$ and R$^8$ is a functional group of CH$_2$OR$^9$ in which R$^9$ is hydrogen or an alkyl group having 1 to 5 carbon atoms.

The above monomer (B2) is used for introducing an N-alkylol group into the copolymer, which undergoes an alcohol-elimination reaction under heat to under crosslinking, so that it imparts the film with the curing function.

Specific examples of the monomer (B2) include monoalkylol (meth)acrylamides such as N-methylacrylamide, N-methylolmethacrylamide, N-(methoxymethyl)acrylamide, N-(methoxymethyl) methacrylamide, N-(ethoxymethyl)acrylamide, N-(ethoxymethyl)methacrylamide, N-(propoxymethyl) acrylamide, N-propoxymethyl)methacrylamide, N-(butoxymethyl)acrylamide, N-(butoxymethyl) methacrylamide, N-(pentoxymethyl)acrylamide, and N-(pentoxymethyl)methacrylamide; and dialkylol (meth) acrylamides such as N,N-di(methylol)acrylamide, N-methylol-N-(methoxymethyl)methacrylamide, N,N-di (methoxymethyl)acrylamide, N-ethoxymethyl-N-methoxymethylacrylamide, N,N-di(ethoxymethyl) acrylamide, N-ethoxymethyl-N-ethoxymethyl-N-propoxymethylmethacrylamide, N,N-di(propoxymethyl) acrylamide, N-butoxymethyl-N-(propoxymethyl) methacrylamide, N,N-di(butoxymethyl)acrylamide, N-butoxymethyl-N-(methoxymethyl)methacrylamide, N,N-di(pentoxymethyl)acrylamide, and N-methoxymethyl-N-(pentoxymethyl)methacrylamide.

The monomer (B3) used in the present invention is a monomer of which the molecule has at least two ethylenically unsaturated bonds. The monomer (B3) introduces polymerizable double bonds in side chains of the copolymer so that it imparts the copolymer with the function of undergoing intermolecular crosslinking when the copolymer is treated with any one of heat, light and actinic light. Specifically, the monomer (B3) is a monomer having ethylenically unsaturated bonds such as (meth)acryl, allyl or cyclohexenyl groups. It constitutes branching points of the resin, and works as a component which gives reaction points where some of the ethylenically unsaturated bonds remain untreated and cure the liquid resin.

The monomer (B3) includes, for example, polyols in which some or all of hydroxyl groups are replaced with (meth)acrylic acid ester, allyl ether or vinyl ether.

The above polyols include aliphatic polyols having at least 2 hydroxyl groups such as ethylene glycol, diethylene glycol, glycerin, trimethylolpropane, pentaerythritol and dipentaerythritol, products prepared by modifying these aliphatic polyols with polyoxyalkylene glycol, epichlorohydrin or caprolactone;

products prepared by modifying carboxylic acids having at least two hydroxyl groups such as phthalic acid, hexahydrophthalic acid, succinic acid, malonic acid, hexanoic diacid, citric acid and pyromellitic acid with polyalkylene glycol or epichlorohydrin;

products prepared by modifying bisphenol A derivatives with polyalkylene glycol or epichlorohydrin;

products prepared by modifying isocyanuric acid derivatives with polyalkylene glycol; and phenols having at least 2 hydroxyl group such as catechol, resorcin, hydroquinone, fluoroglucin and pyrogallol.

Further, the monomer (B3) includes bicyclohexene, bismaleinimide and divinylbenzene. The number of the ethylenically unsaturated bonds in one molecule is preferably 2 to 6.

The monomer (B) used in the present invention is at least one of the above monomers (B1), (B2) and (B3).

When the curable liquid resin of the present invention is a copolymer from the monomers (A) and (B), the amount of the monomer (A) is 10 to 90% by weight, and the amount of the monomer (B) is 90 to 10% by weight. When the curable liquid resin of the present invention is a copolymer from the monomers (A), (B) and (C), the amount of the monomer (A) is 10 to 90% by weight, the amount of the monomer (B) is 0.1 to less than 90% by weight, and the amount of the monomer (C) is more than 0 to 40% by weight.

When the curable liquid resin of the present invention is a copolymer from the monomers (A), (B) and (C), the amount of the monomer (B) differs depending upon its kinds. The amount of the monomer (B) is preferably as follows.

When the monomer (B) is the monomer (B1), the curable liquid resin is a copolymer preferably from 10 to 90 % by weight of the monomer (A), 5 to less than 90% by weight of the monomer (B1) and more than 0 to 40% by weight of the monomer (C). When the monomer (B) is the monomer (B2), the curable liquid resin is a copolymer preferably from 10 to 90% by weight of the monomer (A), 1 to less than 50% by weight of the monomer (B2) and more than 0 to 40% by weight of the monomer (C). When the monomer (B) is the monomer (B3), the curable liquid resin is a copolymer preferably from 10 to 90% by weight of the monomer (A), 0.1 to less than 50% by weight of the monomer (B3) and more than 0 to 40% by weight of the monomer (C).

In the amount of the monomer (B), the amount of the monomer (B1) is preferably 5 to 90% by weight, more preferably 10 to 60% by weight, the amount of the monomer (B2) is preferably 1 to 40% by weight, more preferably 3 to 25% by weight, and the amount of the monomer (B3) is preferably 0.1 to 50% by weight, more preferably 0.5 to 35% by weight.

When the amount of the monomer (B) is smaller than the above corresponding lower limit, undesirably, it is difficult to obtain a hard film. When the amount of the monomer (B) is greater than the above corresponding upper limit, undesirably, the liquid resin has a high viscosity so that it is difficult to apply.

The polymerizable vinyl monomer (C) is used in such an amount that the liquid resin of the present invention can be maintained in a liquid state, for, improving the cured film in water resistance and hardness.

Specific examples of the polymerizable vinyl monomer (C) include aromatic monomers such as styrene and vinyltoluene; (meth)acrylates containing an alkyl group laving 3 carbon atoms or less, such as methyl methacrylate and ethyl acrylate; monomers containing an alkoxy or hydroxyl group such as 2-hydroxyethyl (meth)acrylate, 2-hydroxypropyl (meth)acrylate, 4-hydroxybutyl (meth)acrylate, glycerol mono(meth)acrylate, diethylene glycol mono(meth)acrylate, dipropylene glycol methacrylate, polyethylene glycol (meth)acrylate and methylethylene glycol (meth)acrylate; and monomers containing carboxylic acid such as maleic acid, iumaric acid, itaconic acid, citraconic acid, alkyl or alkenyl monoesters of these, phthalic acid β-(meth)acryloxyethyl monoester, isophthalic acid β-(meth)acryloxyethyl monoester, terephthalic acid β-(meth) acryloxyethyl monoester, succinic acid β-(meth) acryloxyethyl monoester, acrylic acid, methacrylic acid, crotonic acid and cinnamic acid. The above monomers may be used alone or in combination. The amount of the polymerizable vinyl monomer (C) based on the liquid resin (copolymer) weight is 0 to 40% by weight, preferably 0 to 30% by weight. When the above amount exceeds the above upper limit, the liquid resin has a high viscosity so that it is difficult to apply the liquid resin.

The liquid resin of the present invention has a number average molecular weight of 10,000 to 200,000, preferably 15,000 to 150,000. When this number average molecular weight is smaller than the above lower limit, undesirably, not only is it difficult to isolate the resin content from the polymerization mixture, but also liquid resin may give a film which is poor in mechanical properties such as flexibility and poor in film properties such as solvent resistance and boiling water resistance. When the above number average molecular weight is larger than the above upper limit, undesirably, the liquid resin can no longer maintain the viscosity sufficient for its application The liquid resin of the present invention can be produced by radical polymerization in which a mixture of the above monomers is dissolved in, or dropwise added to a solvent in the presence of a radical polymerization initiator. The radical polymerization initiator can be selected from known compounds, such as benzoyl peroxide, tert-butyl peroxide, cummene hydroperoxide, lauroyl peroxide, organic peroxides described in "Handbook of Crosslinking Agents" pages 520 to 535, 2nd edition, published by Taiseisha, azo compounds such as azobisisobutyronitrile and azobiscyclohexanenitrile, and persulfate initiators such as potassium persulfate and ammonium persulfate.

The above solvent includes ethyl acetate, toluene, methyl ethyl ketone, benzene, dioxane, n-propanol, methanol, isopropanol, tetrahydrofuran, n-butanol, sec-butanol, tert-butanol, isobutanol, methyl cellosolve, butyl cellosolve, methyl carbitol, ethyl carbitol, methyl cellosolve acetate, ethyl cellosolve acetate and diacetone alcohol. Of the above solvents, preferred are water-miscible solvents such as dioxane, n-propanol, methanol, isopropanol, tetrahydrofuran, methyl cellosolve, butyl cellosolve, methyl carbitol and ethyl carbitol, since the resin content can be easily isolated from the reaction mixture by adding water. The so-obtained resin is in a liquid state and has a viscosity, measured at 50° C., of 500 to 30,000 cps, preferably 800 to 10,000 cps.

The liquid resin of the present invention can be used substantially as a solvent-free film-forming material, while it may be used as a composition for forming a film (composition for use as a film-forming material). The composition may contain a small amount of water or an organic solvent for improving the coatability, while the amount thereof is up to 5% by weight based on the liquid resin.

A curing catalyst may be incorporated into the liquid resin of the present invention for promoting the curability of the liquid resin.

For example, for promoting the oxidation polymerization reaction of the functional group derived from the monomer (B2), a metal salt dryer may be incorporated as a catalyst. The metal salt dryer includes cobalt naphthenate, cobalt octoate, manganese naphthenate, copper naphthenate, zirconium naphthenate, vanadyl octoate, calcium naphthenate, barium naphthenate and zinc naphthenate.

Further, for promoting the alcohol-elimination reaction of the functional group derived from the monomer (B2), the following compounds may be used as a catalyst. That is, this catalyst is selected from acidic compounds such as p-toluenesulfonic acid and phosphoric acid, organic acid metal salts such as sodium acetate, zinc naphthenate, cobalt naphthenate, zinc octylate and tin octylate, Lewis acids such as stannous chloride, aluminum chloride, ferric chloride, titanium chloride, zinc chloride and antimony chloride, basic compounds such as butylamine, ethylenediamine, triethylamine and imidazole, amino acids such as glycine, metal acetyl acetonates such as aluminum acetyl acetonate, chromium acetylacetonate, titania acetylacetonate and cobalt acetylacetonate, and tin compounds such as dibutyltin dilaurate, dibutyltin diacetate and dibutyltin oxide. Of these, p-toluenesulfonic acid and dibutyltin dilaurate are preferred for the composition for use as a film-forming material, provided by the present invention.

Further, the liquid resin can be cured by treating the (meth)acryl group which is derived from the monomer (B3)

and remains unreacted, with heat, light or actinic light to crosslink it. For the treatment with heat, it is preferred to use, as a catalyst, a heat-decomposable radical initiator such as azobisisobutyronitrile or benzoyl peroxide in an amount of 0.001 to 10% by weight based on the total amount of the composition. For the treatment with light, it is preferred to use, as a catalyst, an optically decomposable initiator such as camphor quinone, benzophenone, diacetyl, benzyl, Michler's ketone, diaryliodonium salt and a polyhalogenated compound in an amount of 0.001 to 10% by weight based on the total amount of the composition. Further, for the treatment with light, a sensitizing dyestuff may be further added.

Further, the composition may further contain a curing agent resin such as an amino resin or a phenolic resin for improving the liquid resin in curability. Further, the composition may contain a known acrylic resin, epoxy resin, polyester or polystyrene for improving the film properties. In this case, the amount of each of the above curing agent resin and the resin for improving the film properties shall not exceed 20% by weight. The composition may further contain a colorant such as titanium white and various pigments, and a lubricant.

The composition for use as a film-forming material, provided by the present invention, can be cured by oxidation polymerization with oxygen in air when applied to a metal plate selected from various steel plates and an aluminum plate or to a substrate such as a plastic film or paper to form a coating having a thickness of 1 to 30 μm. Further, it can be cured by heating the formed coating at a temperature between 20° and 250° C. for 20 seconds to 5 days The composition can be applied by a method using a roll coater, a knifer coater or the like.

The liquid resin of the present invention can be used as a compatibilizer, an interface modifier, a pigment dispersing agent.

EXAMPLES

The present invention will be explained more in detail with reference to Examples hereinafter, while it shall not be limited to Examples. In Examples, "%" stands for "% by weight".

The abbreviations of compounds used in Examples refer to the following.

Monomer (A)

A-1: Stearyl methacrylate

A-2: Cetyl methacrylate

A-3: Lauryl methacrylate

A-4: n-Butyl methacrylate

A-5: Methoxypolyethylene glycol (n=9) methacrylate

A-6: Methoxytetraethylene glycol methacrylate

A-7: Stearyl acrylate

Monomer (B2)

B2-1: N-(Methoxymethyl)methacrylamide

B2-2: N-Methylolacrylamide

B2-3: N,N-Di(methoxymethyl)methacrylamide

B2-4: N-Methylol-N-(methoxymethyl)acrylamide

Monomer (B3)

B3-1: Polyethylene glycol (#400) diacrylate

B3-2: Polyethylene glycol (#200) diacrylate

B3-3: Diethylene glycol dimethacrylate

B3-4: 1,6-Hexanediol diacrylate

B3-5: Trimethylolpropane triacrylate

B3-6: Diethylene glycol diacrylate

B3-7: Trimethylolpropane trimethacrylate

Monomer (C)

STY: Styrene

Synthesis of Monomer B1-1

A 500-ml four-necked round-bottom flask having a stirrer, a nitrogen-introducing tube, a temperature sensor and a condenser was charged with the following components.

| glycidyl methacrylate | 71 g |
|---|---|
| linolenic acid | 139 g |
| hydroquinone | 0.7 g |

The temperature within the flask was increased to 100° C., and the mixture was allowed to react in nitrogen atmosphere for 8 hours. The resultant monomer (monomer 1) was an odorless viscous liquid. GPC analysis showed that the yield was 95%, and that the amount of a formed polymer was 3%.

synthesis of Monomer B1-2

A 500-ml four-necked round-bottom flask having a stirrer, a nitrogen-introducing tube, a temperature sensor and a condenser was charged with the following components.

| glycidyl methacrylate | 71 g |
|---|---|
| linseed oil fatty acid | 139 g |
| hydroquinone | 0.7 g |

The temperature within the flask was increased to 100° C., and the mixture was allowed to react in a nitrogen atmosphere for 8 hours. The resultant monomer (monomer 2) was an odorless viscous liquid. GPC analysis showed that the yield was 95%, and that the amount of a formed polymer was 3%.

Synthesis Procedure 1

A 500-ml four-necked round-bottom flask having a stirrer, a nitrogen-introducing tube, a temperature sensor and a condenser was charged with isopropyl alcohol (IPA), monomer (A), monomer (B) and optionally water and monomer (C), and the temperature within the flask was increased to 65° C. in a hot water bath. The reaction was continued in the hot water bath for 4 hours, and 50 ml of water was added to the reaction mixture to precipitate a resin. When the precipitation started, contents in the flask were recharged into a 500-ml beaker with swirling. The supernatant was removed, and then, the beaker with the remainder in it was placed in a pressure-reduced oven at 60° C. The remainder was dried at 5 mmHg overnight.

Synthesis Procedure 2

A 500-ml four-necked round-bottom flask having a stirrer, a nitrogen-introducing tube, a temperature sensor and a condenser was charged with isopropyl alcohol (IPA), monomer (A), monomer (B) and optionally water and monomer (C), and the temperature within the flask was increased to 65° C. in a hot water bath. The reaction was continued in the hot water bath for 4 hours, and 50 ml of water was added to the reaction mixture to precipitate a resin. When the precipitation started, contents in the flask were recharged into a 500-ml beaker with swirling. The supernatant was removed, and 300 ml of dioxane was added to, redissolve the resin. Then, 100 ml of methanol was added to re-precipitate the resin. The supernatant was removed, and the remainder was dried under reduced pressure overnight.

Synthesis Procedure 3

A 500-ml four-necked round-bottom flask having a stirrer, a nitrogen-introducing tube, a temperature sensor and a condenser was charged with isopropyl alcohol (IPA), monomer (A), monomer (B) and optionally water and monomer (C), and these components were allowed to react in a hot water bath at a solvent-refluxing temperature for 5 hours. The reaction mixture was allowed to stand with cooling it with ice, to form two layers. The upper layer was removed, and the lower layer was washed with petroleum ether, and dried with a vacuum dryer for 5 hours to give a liquid polymer.

Liquid resins were obtained from monomer (A), monomer (B) and monomer (C) shown in Table 1 in amounts shown in Table 1 in the presence of solvent shown in Table 1 in an amount shown in Table 1. The so-obtained resins were in the state of an odorless viscous liquid. Each liquid resin was measured for a number average molecular weight by molecular weight measurement using GPC (as styrene) and measured for a viscosity at 50° C. with a rotary vibration viscometer (VM-100, supplied by Yamaichi Electric. Co., Ltd.). Table 1 shows the results.

TABLE 1

| | Monomers | | | | | | | Molecular | Melt | |
| | (A) | (B) (molar ratio) | (C) | (A):(B):(C) g:g:g | Initiator*1 g | IPA ml | Water ml | weight Mn (10⁴) | viscosity (50° C.) cps | Procedure*2 |
|---|---|---|---|---|---|---|---|---|---|---|
| Ex. | | | | | | | | | | |
| 1 | A-3 | B1-1 | — | 45:10:0 | 1 | 200 | 50 | 2.7 | 15,000 | 1 |
| 2 | A-3 | B1-1 | — | 45:2:0 | 1 | 225 | 25 | 3.2 | 18,000 | 1 |
| 3 | A-3 | B1-2 | — | 45:10:0 | 1 | 200 | 50 | 2.4 | 16,000 | 2 |
| 4 | A-2 | b1-1 | — | 55:10:0 | 1 | 220 | 60 | 2.0 | 16,500 | 1 |
| 5 | A-7 | B1-1 | STY | 40:10:3 | 0.6 | 220 | 25 | 1.3 | 23,000 | 1 |
| 6 | A-5 | B1-1 | — | 45:10:0 | *0.5 | 150 | 100 | 2.5 | 9,000 | 1 |
| 7 | A-5 | B1-1 | — | 45:10:0 | *0.5 | 200 | 50 | 3.2 | 12,000 | 1 |
| 8 | A-5 | B1-2 | — | 45:10:0 | 1 | 150 | 100 | 2.2 | 10,000 | 2 |
| 9 | A-6 | B1-1 | — | 45:10:0 | *0.5 | 150 | 100 | 2.2 | 15,000 | 1 |
| 10 | A-6 | B1-1 | STY | 45:10:3 | *0.5 | 150 | 100 | 2.0 | 20,000 | 1 |
| 11 | A-3/A-5 (4/6) | B1-1 | STY | 40.1:10:3 | *0.5 | 150 | 100 | 1.2 | 8,000 | 1 |
| 12 | A-3 | B2-1 | — | 45:10:0 | 0.5 | 150 | 100 | 2.5 | 10,000 | 1 |
| 13 | A-3 | B2-1 | — | 45:10:0 | 0.5 | 200 | 50 | 0.7 | 13,000 | 1 |
| 14 | A-3 | B2-2 | — | 45:10:0 | 0.5 | 150 | 100 | 3.0 | 15,000 | 2 |
| 15 | A-2 | B2-3 | — | 45:10:0 | 0.5 | 150 | 100 | 2.7 | 18,000 | 1 |
| 16 | A-1 | B2-4 | STY | 45:10:3 | 0.5 | 150 | 100 | 2.2 | 15,000 | 1 |
| 17 | A-5 | B2-1 | — | 45:10:0 | *0.5 | 150 | 100 | 2.2 | 7,000 | 1 |
| 18 | A-5 | B2-1 | — | 45:10:0 | *0.5 | 200 | 50 | 2.5 | 10,000 | 1 |
| 19 | A-5 | B2-1 | — | 45:10:0 | 0.5 | 150 | 100 | 2.7 | 12,000 | 2 |
| 20 | A-6 | B2-1 | — | 45:10:0 | *0.5 | 150 | 100 | 2.3 | 14,500 | 1 |
| 21 | A-6 | B2-4 | STY | 45:10:3 | *0.5 | 150 | 100 | 1.5 | 20,000 | 1 |
| 22 | A-3/A-6 (1/2) | B2-1 | STY | 50.2:20:3 | *0.5 | 150 | 100 | 1.2 | 8,000 | 1 |
| 23 | A-3 | B3-1 | — | 100:10:0 | 1.1 | 257 | 0 | 1.7 | 9,000 | 1 |
| 24 | A-3 | B3-2 | — | 100:6:0 | 1.1 | 247 | 0 | 2.3 | 18,000 | 3 |
| 25 | A-3 | B3-5 | — | 100:6:0 | 1.1 | 247 | 0 | 3.0 | 16,500 | 3 |
| 26 | A-4 | B3-1 | — | 100:11:0 | 1.1 | 259 | 0 | 2.8 | 28,000 | 3 |
| 27 | A-5 | B3-1 | — | 100:5.7:0 | 1.1 | 247 | 0 | 1.8 | 8,000 | 3 |
| 28 | A-5 | B3-2 | — | 100:0.3:0 | 1.0 | 234 | 0 | 2.0 | 8,500 | 3 |
| 29 | A-5 | B3-2 | — | 100:2.0:0 | 1.0 | 238 | 0 | 2.2 | 9,000 | 3 |
| 30 | A-5 | B3-2 | — | 100:3.5:0 | 1.0 | 242 | 0 | 3.0 | 12,000 | 3 |
| 31 | A-5 | B3-3 | — | 100:2.7:0 | 1.0 | 240 | 0 | 2.0 | 15,000 | 3 |
| 32 | A-5 | B3-4 | — | 100:2.5:0 | 1.0 | 239 | 0 | 2.2 | 13,000 | 3 |
| 33 | A-5 | B3-5 | — | 100:3.3:0 | 1.0 | 241 | 0 | 3.5 | 20,000 | 3 |
| 34 | A-5 | B3-6 | — | 100:2.4:0 | 1.0 | 239 | 0 | 1.7 | 13,000 | 3 |
| 35 | A-5 | B3-7 | — | 100:3.8:0 | 1.0 | 242 | 0 | 3.1 | 17,500 | 3 |
| 36 | A-6 | B3-2 | — | 100:5.5:0 | 1.1 | 246 | 0 | 2.0 | 12,000 | 3 |
| 37 | A-3/A-5 (4/6) | B3-1 | — | 100:6.8:0 | 1.1 | 249 | 0 | 1.8 | 4,000 | 3 |
| 38 | A-3/A-5 (4/6) | B3-2 | — | 100:4.2:0 | 1.0 | 243 | 0 | 2.0 | 5,000 | 3 |
| 39 | A-3/A-5 (4/6) | B3-3 | — | 100:3.2:0 | 1.0 | 241 | 0 | 2.1 | 9,000 | 3 |
| 40 | A-3/A-5 (4/6) | B3-4 | — | 100:3.1:0 | 1.0 | 241 | 0 | 2.0 | 7,000 | 3 |
| CEx. | | | | | | | | | | |
| 1 | — | B1-1 | — | 0:45:0 | 1 | 200 | 50 | 3.0 | solid | 1 |
| 2 | A-3 | B1-1 | — | 45:2:0 | 1 | 200 | 50 | 2.8 | 2,000 | 1 |
| 3 | A-5 | B1-1 | — | 45:2:0 | *0.5 | 150 | 100 | 2.8 | 2,000 | 1 |

TABLE 1-continued

| | Monomers | | | | | | | Molecular | Melt | |
| | (A) | (B) (molar ratio) | (C) | (A):(B):(C) g:g:g | Initiator*1 g | IPA ml | Water ml | weight Mn (10⁴) | viscosity (50° C.) cps | Procedure*2 |
|---|---|---|---|---|---|---|---|---|---|---|
| 4 | — | B2-1 | — | 0:45:0 | 0.5 | 150 | 100 | 3.6 | solid | 1 |
| 5 | A-3 | B2-1 | — | 45:2:0 | 0.5 | 150 | 100 | 3.9 | 5,000 | 1 |
| 6 | A-5 | B2-1 | — | 45:2:0 | *0.5 | 150 | 100 | 3.5 | 2,000 | 1 |

Ex. = Example, CEx. = Comparative Example
*1 Asterisk (*) indicates the use of potassium persulfate (No-asterisk indicates the use of azobisisobutyronitrile).
*2 Synthesis Procedure 1, 2 or 3

A composition for use as a film-forming material was prepared by adding 0.03% of cobalt naphthenate to above-obtained liquid resin. The composition was dropped on a hard aluminum plate on a hot plate at 80° C., and applied with a 1-mil applicator. There was no odor of low-molecular-weight organic compounds such as remaining monomers during the application. The resultant creating was uniform and free of coating defects such as a pinhole. It was allowed to stand under curing conditions shown in Table 2, to give a smooth hard film. The film surface was evaluated for contact-tack, and tested for a film remaining ratio (adhesion) by a crosscut peel test. Further, the aluminum plate with the film formed thereon was immersed in methyl ethyl ketone for 10 minutes, and then immersed in boiling water for 1 hour. Table 2 shows the results.

TABLE 2

| Liquid resin | Curing conditions | Tack *3 | Solvent resistance *3 | Boiling water resistance*3 | Adhesion (%) *4 |
|---|---|---|---|---|---|
| Ex. 1 | 20° C., 24 hours | A | A | A | 100 |
| Ex. 1 | 180° C., 1 minute | A | A | A | 100 |
| Ex. 2 | 20° C., 24 hours | A | A | A | 100 |
| Ex. 3 | 20° C., 24 hours | A | A | A | 100 |
| Ex. 4 | 20° C., 24 hours | A | A | B | 90 |
| Ex. 5 | 20° C., 24 hours | A | B | B | 80 |
| CEx. 2 | 20° C., 24 hours | A | C | B | 70 |
| Ex. 6 | 20° C., 24 hours | A | A | A | 100 |
| Ex. 6 | 180° C., 1 minute | A | A | A | 100 |
| Ex. 7 | 20° C., 24 hours | A | A | A | 100 |
| Ex. 8 | 20° C., 24 hours | A | A | A | 100 |
| Ex. 9 | 20° C., 24 hours | A | A | B | 90 |
| Ex. 10 | 20° C., 24 hours | A | B | B | 80 |
| CEx. 3 | 20° C., 24 hours | A | C | B | 70 |
| Ex. 11 | 20° C., 24 hours | A | A | A | 100 |

Ex. = Example, CEx. = Comparative Example
*3: A: No tack, Not whitened. B: Slight tacking nature, Showing a slight dull color. C: Clear tacking nature, Whitened.
*4: Film remaining ratio in Cellophane tape peel test.

A composition f,r use as a film-forming material was prepared by adding 0.3% of a curing catalyst shown in Table 3. The composition was dropped on a hard aluminum plate on a hot plate at 80° C., and applied with a 1-mil applicator. There was no odor of low-molecular-weight organic compounds such as remaining monomers during the application. The resultant coating was uniform and free of coating defects such as a pinhole. It was baked at 180° C. for 30 minutes to give a smooth hard film. The film surface was evaluated for contact-tack, and tested for a film remaining ratio (adhesion) by a crosscut peel test. Further, the aluminum plate with the film formed thereon was immersed in methyl ethyl ketone for 10 minutes, and then immersed in boiling water for 1 hour. Table 3 shows the results.

TABLE 3

| Liquid resin | Curing conditions | Tack *3 | Solvent resistance *3 | Boiling water resistance*3 | Adhesion (%) *4 |
|---|---|---|---|---|---|
| Ex. 12 | dibutyltin dilaurate | A | A | A | 100 |
| Ex. 12 | p-toluenesulfoic acid | A | A | A | 100 |
| Ex. 13 | dibutyltin dilaurate | A | A | A | 100 |
| Ex. 14 | dibutyltin dilaurate | A | A | A | 100 |
| Ex. 15 | dibutyltin dilaurate | A | A | B | 90 |
| Ex. 16 | dibutyltin dilaurate | A | B | B | 80 |
| CEx. 5 | dibutyltin dilaurate | C | C | B | 70 |
| Ex. 17 | dibutyltin dilaurate | A | A | A | 100 |
| Ex. 17 | p-toluensulfoic acid | A | A | A | 100 |
| Ex. 18 | dibutyltin dilaurate | A | A | A | 100 |
| Ex. 19 | dibutyltin dilaurate | A | A | A | 100 |
| Ex. 20 | dibutyltin dilaurate | A | A | B | 90 |
| Ex. 21 | dibutyltin dilaurate | A | B | B | 80 |
| CEx. 6 | dibutyltin dilaurate | C | C | B | 70 |
| Ex. 22 | dibutyltin dilaurate | A | A | A | 100 |

Ex. = Example, CEx. = Comparative Example
*3: A: No tack, Not whitened. B: Slight tacking nature, Showing a slight dull color. C: Clear tacking nature, Whitened.
*4: Film remaining ratio in Cellophane tape peel test.

Example 41

A 500-mil four-necked round-bottom flask having a stirrer, a nitrogen-introducing tube, a temperature sensor and a condenser was charged with the following components.

| | |
|---|---|
| IPA | 200 g |
| Water | 50 g |
| A-5 | 72 g |
| A-3 | 27 g |
| B3-2 | 4.2 g |
| AIBN | 1 g |

The temperature within the flask was increased in 74° C. in a hot water bath, and the mixture was allowed to react for 4 hours. Then, 50 g of water was added to the reaction mixture to form two layers. The upper layer was removed, and the remaining lower layer was washed with petroleum ether, placed in a pressure-reduced dryer and dried for more than 5 hours under reduced pressure. The yield was 95%.

Comparative Example 7

A 500-mil four-necked round-bottom flask having a stirrer, a nitrogen-introducing tube, a temperature sensor and a condenser was charged with the following components.

| | |
|---|---|
| IPA | 240 g |
| A-4 | 50 g |
| B3-1 | 54 g |
| AIBN | 1 g |

The temperature within the flask was increased to 74° C. in a hot water bath. In 30 minutes after the reaction was initiated, a gel-like reaction mixture was formed, and the reaction was therefore terminated.

Comparative Example 8

A 500-mil four-necked round-bottom flask having a stirrer, nitrogen-introducing tube, a temperature sensor and a condenser was charged with the following components.

| | |
|---|---|
| IPA | 250 g |
| A-5 | 72 g |
| A-3 | 27 g |
| AIBN | 1 g |

The temperature within the flask was increased to 74° C. in a hot water bath, and the mixture was allowed to react for 4 hours. Then, the reaction mixture was cooled with ice to form two layers. The upper layer was removed, and the remaining lower layer was washed with petroleum ether, placed in a pressure-reduced dryer and dried for more than 5 hours under reduced pressure. The yield was 93%. The so-obtained liquid resin had a number average molecular weight, Mn, of 20,000 and a melt viscosity, measured at 50° C., of 4,500 cps.

Benzophenone in an amount of 0.05 g was added to 5 g of each of the liquid resins obtained in Examples 23 to 50 and Comparative Example 8, and the resultant mixtures were separately stirred with a mechanical stirrer at room temperature. Each composition was separately applied to an aluminum plate with a 0.5 mil applicator, and the resultant coatings were irradiated with light five times with a UV irradiation apparatus (UV3000, supplied by Toshiba Corp., two 3 kW mercury lamps, 120 W/cm, conveyer speed 10 m/minute). The resultant films were tested for a pencil hardness (according to JIS-K-5440) and a solvent resistance (film remaining ratio after MEK rubbing test effected 50 times). Table 4 shows the results.

TABLE 4

| Film properties after irradiation with UV light | | |
|---|---|---|
| Example | Pencil hardness | Solvent resistance |
| 23 | HB | 100 |
| 24 | B | 90 |
| 25 | HB | 100 |
| 26 | H | 100 |
| 27 | 3B | 80 |
| 28 | 2B | 80 |
| 29 | B | 90 |
| 30 | HB | 100 |
| 31 | HB | 100 |
| 32 | H | 100 |
| 33 | H | 100 |
| 34 | HB | 100 |
| 35 | HB | 100 |
| 36 | H | 100 |
| 37 | 2B | 80 |
| 38 | B | 85 |
| 39 | HB | 100 |

TABLE 4-continued

| Film properties after irradiation with UV light | | |
|---|---|---|
| Example | Pencil hardness | Solvent resistance |
| 40 | B | 85 |
| Comparative Example 8 | Tack | 0 |

Benzoyl peroxide in an amount of 0.05 g was added to 5 g of each of the liquid polymers obtained in Examples 24, 28 to 31, 36 and 38 and Comparative Example 8, and the resultant mixtures were separately stirred with a mechanical stirrer at room temperature. Each composition was applied to an aluminum plate with a 5 mil applicator, and heated at 150° C. for 10 minutes. The resultant films were tested for a pencil hardness (according to JIS-K-5440) and a solvent resistance (film remaining ratio after MEK rubbing test effected 50 times). Table 5 shows the results.

TABLE 5

| Film properties after cured under heat | | |
|---|---|---|
| Example | Pencil hardness | Solvent resistance |
| 24 | HB | 100 |
| 28 | B | 85 |
| 29 | HB | 100 |
| 30 | H | 100 |
| 31 | HB | 100 |
| 36 | H | 100 |
| 38 | B | 90 |
| Comparative Example 8 | tack | 0 |

The composition for use as a film-forming material, provided by the present invention, contains no solvent, and is therefore free from the scattering of the solvent and monomers when applied, so that the working environment is improved and that the solvent is not at all released into atmosphere.

What is claimed is:

1. A liquid resin having a number average molecular weight of 10,000 to 200,000 and a viscosity, measured at 50° C., in the range of from 500 cps to 30,000 cps, the liquid resin being a copolymer obtained from (A) a monomer of the formula (1) or (2), $$CH_2=C(R^1)COO-R^2 \qquad (1)$$

wherein $R^1$ is hydrogen or methyl, and $R^2$ is an alkyl group having 8 to 22 carbon atoms, $$CH_2=C(R^3)COO(C_nH_{2n}O)_m-R^4 \qquad (2)$$

wherein $R^3$ is hydrogen or methyl, $R^4$ is an alkyl group having 1 to 5 carbon atoms, n is an integer of 1 to 3 and m is an integer of 4 to 25, and (B) at least one monomer selected from the group consisting of (B1) a monomer prepared by reacting an ethylenically unsaturated epoxide (a) with a fatty acid (b) of the formula (3)

$$R^5COOH \qquad (3)$$

wherein $R^5$ is an unsaturated aliphatic hydrocarbon group having 3 to 30 carbon atoms and having at least one double bond, (B2) a monomer of the formula (4),

$$CH_2=C(R^6)CONR^7R^8 \qquad (4)$$

wherein $R^6$ is hydrogen or methyl and each of $R^7$ and $R^8$ is hydrogen or a functional group of $CH_2OR^9$ provided that at least one of $R^7$ and $R^8$ is a functional group of $CH_2OR^9$ in which $R^9$ is hydrogen or an alkyl group having 1 to 5 carbon atoms, and (B3) a monomer whose molecule has at least two ethylenically unsaturated double bonds.

2. A liquid resin according claim 1, wherein the liquid resin is a copolymer from 10 to 90% by weight of the monomer (A) and 10 to 90% by weight of the monomer (B).

3. A liquid resin according to claim 1, wherein the monomer (A) contains the monomer of the formula (1) and the monomer of the formula (2) in a monomer of the formula (1):monomer of the formula (2) mixing ratio of 1:9 to 9:1.

4. A liquid resin according to claim 1, wherein the monomer (A) is a monomer of the formula (1) in which $R^2$ is an alkyl group having 8 to 20 carbon atoms.

5. A liquid resin according to claim 1, wherein $R^5$ in the formula (3) for the fatty acid (b) is an unsaturated aliphatic hydrocarbon group having 16 to 22 carbon atoms and having at least 1 unsaturated bond.

6. A liquid resin according to claim 1, wherein $R^5$ in the formula (3) for the fatty acid (b) is an unsaturated aliphatic hydrocarbon group having 16 to 22 carbon atoms and having at least 2 unsaturated bonds.

7. A liquid resin according to claim 1, wherein the fatty acid (b) is a fatty acid which has an iodine value of at least 100 and is obtained from plant oils or animal oils.

8. A liquid resin having a number average molecular weight of 10,000 to 200,000 and a viscosity, measured at 50° C., in the range of from 500 cps to 30,000 cp, the liquid resin being a copolymer obtained from the monomers (A) and (B) as recited in claim 1 and other polymerizable vinyl monomer (C).

9. A liquid resin according to claim 8, wherein the liquid resin is a copolymer from 10 to 90% by weight of the monomer (A), 0.1 to 90% by weight of the monomer (B) and more than 0 to 40% by weight of the monomer (C).

10. A liquid resin according to claim 9, wherein the liquid resin is a copolymer from 10 to 90% by weight of the monomer (A), 5 to less than 90% by weight of the monomer (B1) and more than 0 to 40% by weight of the monomer (C).

11. A liquid resin according to claim 9, wherein the liquid resin is a copolymer from 10 to 90% by weight of the monomer (A), 1 to less than 50% by weight of the monomer (B2) and more than 0 to 40% by weight of the monomer (C).

12. A liquid resin according to claim 9, wherein the liquid resin is a copolymer from 10 to 90% by weight of the monomer (A), 0.1 to less than 50% by weight of the monomer (B3) and more than 0 to 40% by weight of the monomer (C).

13. A process for the production of a curable liquid resin, which comprises radical-polymerizing the monomers (A) and (B) as recited in claim 1 in a water-soluble or water-miscible solvent containing water or no water.

14. A process for the production of a curable liquid resin, which comprises radical-polymerizing the monomers (A), (B) and (C) as recited in claim 8 in a water-soluble or water-miscible solvent containing water or no water.

15. A composition for use as a film-forming material, which contains the curable liquid resin as recited in claim 1 and a curing catalyst.

16. A liquid resin according to claim 11, wherein the amount of monomer (B2) is 1 to 40% by weight.

* * * * *

UNITED STATES PATENT AND TRADEMARK OFFICE
CERTIFICATE OF CORRECTION

PATENT NO. : 5,644,010
DATED : July 1, 1997
INVENTOR(S) : TORU KURIHASHI, MIKI KAWASHIMA, TAKEO YAMAGUCHI It is certified that error appears in the above-identified patent and that said Letters Patent is hereby corrected as shown below:

Column 16, in claim 1, in formula (2), change "$(C,H_{2n}O)_m$" to read --$(C_nH_{2n}O)_m$--.

Column 18, in claim 8, line 3, "cp" should read --cps--.

Column 18, in claim 13, line 3, "I" should read --1--.

Signed and Sealed this

Thirty-first Day of March, 1998

Attest:

BRUCE LEHMAN

Attesting Officer     Commissioner of Patents and Trademarks